(12) United States Patent
Betley et al.

(10) Patent No.: US 11,517,987 B1
(45) Date of Patent: Dec. 6, 2022

(54) INSTALLING TRIM IN A VALVE ASSEMBLY

(71) Applicant: Dresser, LLC, Houston, TX (US)

(72) Inventors: Justin Walter Betley, Raynham, MA (US); Peter David Gosselin, Weymouth, MA (US); Timothy Daniel Rogers-Hehr, Jacksonville, FL (US); Vigneshwar Shaliwan Wali, Jacksonville, FL (US)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/504,658

(22) Filed: Oct. 19, 2021

(51) Int. Cl.
  *B23P 15/00* (2006.01)
  *F16K 1/42* (2006.01)
  *F16K 1/36* (2006.01)

(52) U.S. Cl.
  CPC .............. *B23P 15/001* (2013.01); *F16K 1/36* (2013.01); *F16K 1/427* (2013.01)

(58) Field of Classification Search
  CPC ........................ F16K 1/36; F16K 1/427; F16K 47/08–47/16; F16K 3/246; F16K 3/267; B23P 15/001; Y10T 137/86759; Y10T 137/86791; Y10T 137/86807; Y10T 137/0491; Y10T 137/0441; Y10T 137/0486; Y10T 137/6011; Y10T 137/6065; Y10T 137/6109; Y10T 137/6116; Y10T 29/53596; Y10T 29/53552; B25B 27/24
  See application file for complete search history.

(56) References Cited

U.S. PATENT DOCUMENTS

| 4,834,133 A * | 5/1989 | LaCoste ................. F16K 3/246 137/315.27 |
| 2014/0264138 A1* | 9/2014 | Bell ....................... F16J 15/125 137/315.27 |
| 2015/0183102 A1* | 7/2015 | Breschi .................. F04B 53/22 29/221.6 |

* cited by examiner

*Primary Examiner* — Marina A Tietjen
(74) *Attorney, Agent, or Firm* — Paul Frank + Collins P.C.

(57) ABSTRACT

A tool configured for use to assemble and install trim into a steam conditioning valve. These configurations can include a device that mounts in place of a bonnet and an actuator that technicians remove from the valve. The device can cantilever the trim assembly, essentially providing a platform on which technicians can slide the trim assembly into the valve body (or out of the valve body) to complete install or repair of the device. As an added benefit, technicians can also use the device to assemble the trim in proximity to the subject valve.

19 Claims, 9 Drawing Sheets

INSTALLING TRIM IN A VALVE ASSEMBLY

BACKGROUND

Flow controls play a large role in many industrial facilities. Power plants and industrial process facilities, for example, use different types of flow controls to manage flow of material, typically fluids, throughout vast networks of pipes, tanks, generators, and other equipment. Steam conditioning valves are useful to reduce pressure and temperature of steam. These valves require a particularly robust design to accommodate the extremely high temperatures (up to 650° C.) and pressures typical of many applications. This design includes certain components, like a valve body that connects to the pipes or pipeline. The valve body houses a valve trim assembly that typically includes a diffuser, a cage, and a moveable closure member. It is not uncommon that the valve body mounts horizontally in these systems. This orientation may complicate assembly of the valve trim into the valve body. Space constraints, for example, can frustrate use of certain equipment that is necessary to lift, hold, or support the heavy, metal pieces of the valve trim.

SUMMARY

The subject matter of this disclosure relates to improvements that address these space constraints. Of particular interest here are embodiments that facilitate install of a valve trim assembly into a horizontally-oriented valve body. These embodiments can secure in place of a bonnet part of the steam conditioning valve and an actuator that controls flow through the device. One benefit of the proposed design is that the embodiments fit within the envelope that the actuator forms in the space around the valve body. This feature avoids interference with adjacent equipment that can frustrate the ability of technicians to efficiently install or service the flow control. As an added benefit, embodiments of the proposed design may also serve as a stand or a stanchion that technicians can use to assemble parts of the valve trim together in proximity to the valve body. Technicians may take advantage of hardware that comes with the device, for example, as part of an installation "kit" or "system." This hardware can integrate with the device structure to secure it to a platform or grating to receive the diffuser, the cage, and the closure member.

DRAWINGS

Reference is now made briefly to the accompanying drawings, in which.

Figure 1:
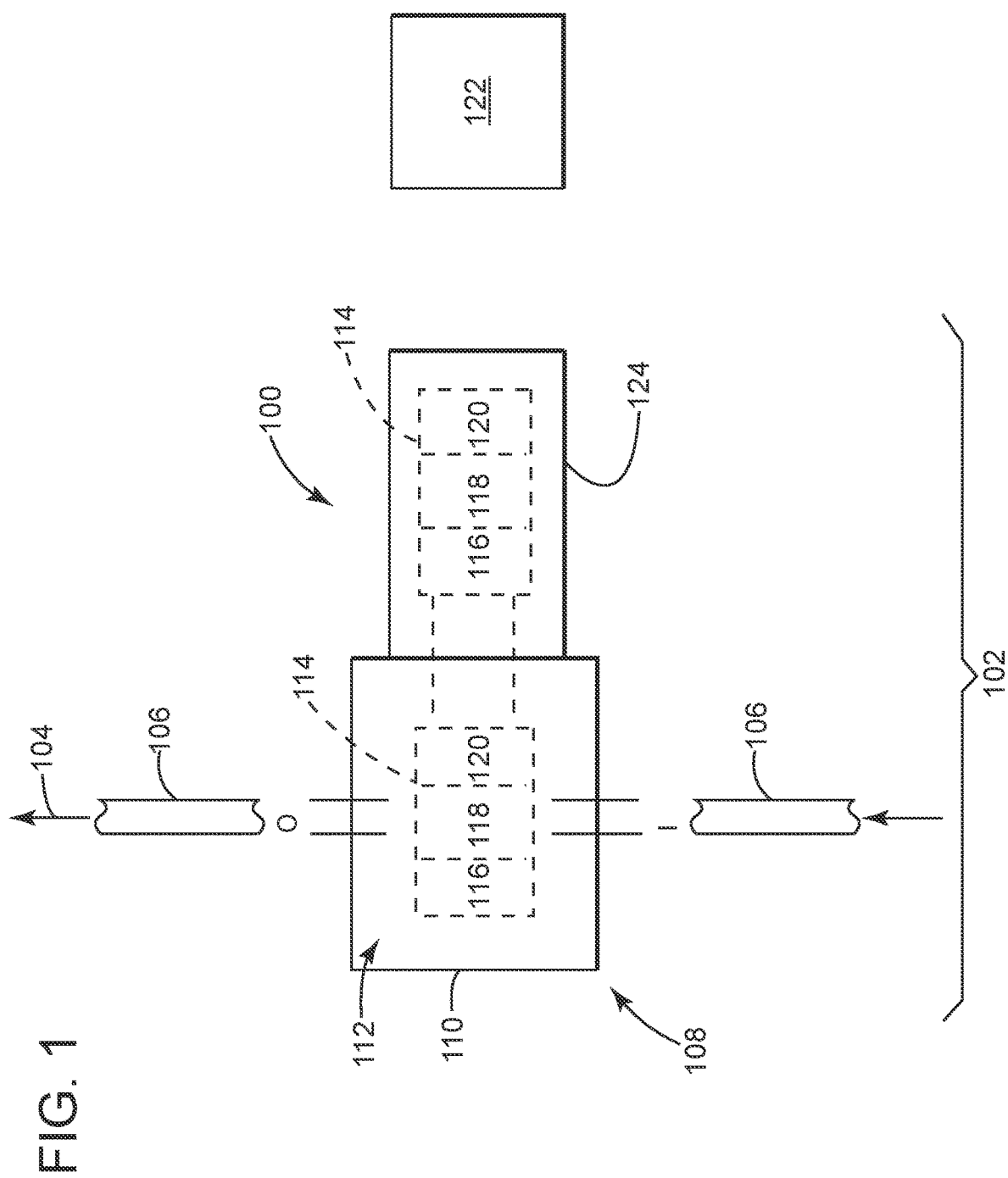
FIG. 1 depicts a schematic diagram of an exemplary embodiment of a tool.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DETAILED DESCRIPTION

The discussion now turns to describe features of the embodiments shown in the drawings noted above. These features may facilitate assembly and repair of flow controls, including steam conditioning valves, which find reference in the discussion below. These valves are known to control steam pressure and temperature in process plants. Notably, the devices for use in these applications are large and heavy, often made of steel and comparable metals. These features make the valves and their parts particular unwieldy for technicians to handle or move without the need for equipment, like cranes or hoists. As noted above, the task to install the valve into a process line or to repair the valve at its location affords some particular challenges, including space constraints that can limit the size of this equipment that would otherwise help technicians to complete the job at hand. The embodiments herein, however, may forego the need for some of this equipment. Other embodiments may be within the scope of this disclosure.

FIG. 1 depicts a schematic diagram of an example of an install tool 100. This example is found at a distribution system 102, typically designed to carry material 104 throughout a network of conduit 106. The tool 100 may connect to a flow control 108, shown here with a valve body 110 that has an internal chamber 112 and openings (e.g., an inlet I, an outlet O, and a trim opening T). The flow control 108 may have a trim assembly 114 that installs inside of the chamber 112. The trim assembly 114 may include a cage 116, a diffuser 118, and a closure member 120, that can move to positions relative to a seat (inside the valve body 110) to regulate flow of material 104. The flow control 108 may also have an actuator 122 that manages these positions of the closure member 120. As also shown, the tool 100 may include a support 124 that can receive the trim assembly 114 in position for technicians to install it into the flow control 108.

Broadly, the install tool 100 may be configured to facilitate assembly and service of valves. These configurations may include devices that can simplify a technician's job. The devices may replace existing tooling, for example, conventional "beam-style" fixtures that often don't fit at or near the device under install or repair. As noted herein, devices of the proposed design do not run into these space limitations; rather its more likely that the proposed design will provide technicians with ample space to complete their tasks, often in less time and with much less effort.

The distribution system 102 may be configured to deliver or move resources. These configurations may embody vast infrastructure. For this example, material 104 is high pressure, high temperature steam; but material 104 could also comprise other gases, liquids, solids, or mixes, as well. The conduit 106 may include pipes or pipelines, often that connect to turbines, condensers, boilers, and the like. The pipes may also connect to tanks or reservoirs or even to residential homes or commercial properties. In many facilities, this equipment forms complex networks with limited space between adjacent equipment.

The flow control 108 may be configured to regulate flow of steam through the conduit 106 in these complex networks. These configurations may include steam conditioning valves and like devices. The valve body 110 in such devices is often made of cast or machined metals. This structure often forms a flange at the openings I, O, T. Adjacent pipes 106 may connect to the openings I,O to allow steam 104 to flow through the internal chamber 112, often through an opening in a seat. Flow is typically in a direction from the "upstream" opening I to the "downstream" opening O. The trim assembly 114 helps to regulate this flow. The diffuser 116 and the cage 118 may comprise perforated members, like a cylinder, that is meant to reduce noise and vibration. The closure member 120 may embody a metal disc or metal "plug." The actuator 122 may couple to the valve body at the opening T. This device may use pneumatics or hydraulics to regulate movement of the plug 118. The position of the plug 120 may correspond with at least a pair of operating states that manage flow of steam 104 through the seat. A first or "open" state allows steam 104 to flow through the opening in the seat. A second or "closed" state can wholly prohibit flow of steam 104 through the opening in the seat. In one implementation, a change in pressure can cause the plug 120 to move between its operating states. This change may cause the device to actuate from is normally open state to its closed state to immediately shut off flow of the steam downstream of the valve body 110.

The support 124 may be configured to hold components of the trim assembly 114. These configurations may include structures that mount to the valve body 110, for example, at the opening T in place of the actuator 122. These structures may comprise metals, like steel, or comparable materials of robust design and integrity to cantilever the weight of the trim assembly 114 off the valve body 110. Technicians may use the device to remove the trim assembly 114 and to install the trim assembly 114, as desired. For install, technicians may place the trim assembly 114 on the support 124 and, when ready, push the trim assembly 114 into the internal chamber 112 to locate the diffuser 116, the cage 118, and the plug 120 inside of the valve body 110. Once complete, technicians may remove the support 124 from the opening T and attach the actuator 122 in its place.

Figure 2:
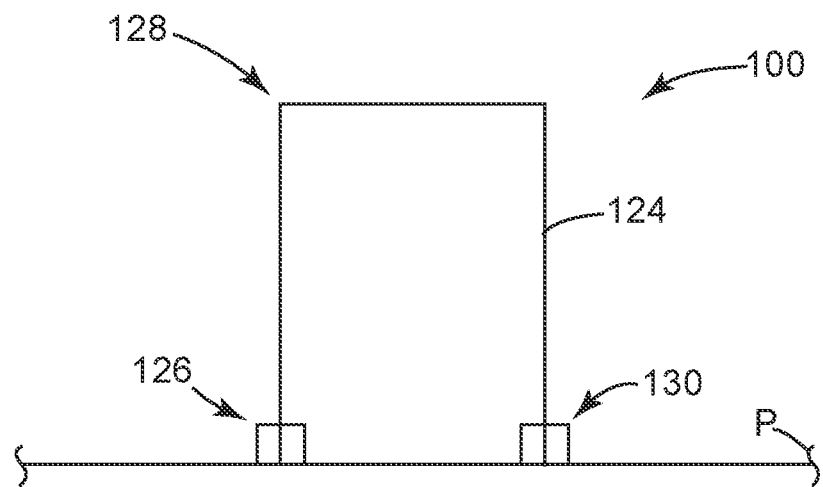
FIG. 2 depicts a perspective of exemplary structure for the tool of FIG. 1.

FIG. 2 depicts a schematic diagram of an example of the tool 100 of FIG. 1. In this example, the support 124 stands upright on its first end 126. This orientation exposes its second end 128 to receive parts of the trim assembly 116. Stabilizing hardware 130 may secure the first end 126 to a platform P. In one implementation, the upright orientation may allow technicians to assemble the trim assembly 116 prior to install into the valve body 110 (FIG. 1). This feature may allow for assembly to occur in proximity to the flow control 108, for example, at the installed location for a steam conditioning valve in the process network 102. In this way, technicians may first assemble the trim assembly 114 and elevate it using a hoist or crate from the support 124. Technicians may then detach the support 124 from the platform P and install it onto the valve body 110 for use to install the assembled trim 114 into the interior chamber 112, as noted above.

Figure 3:
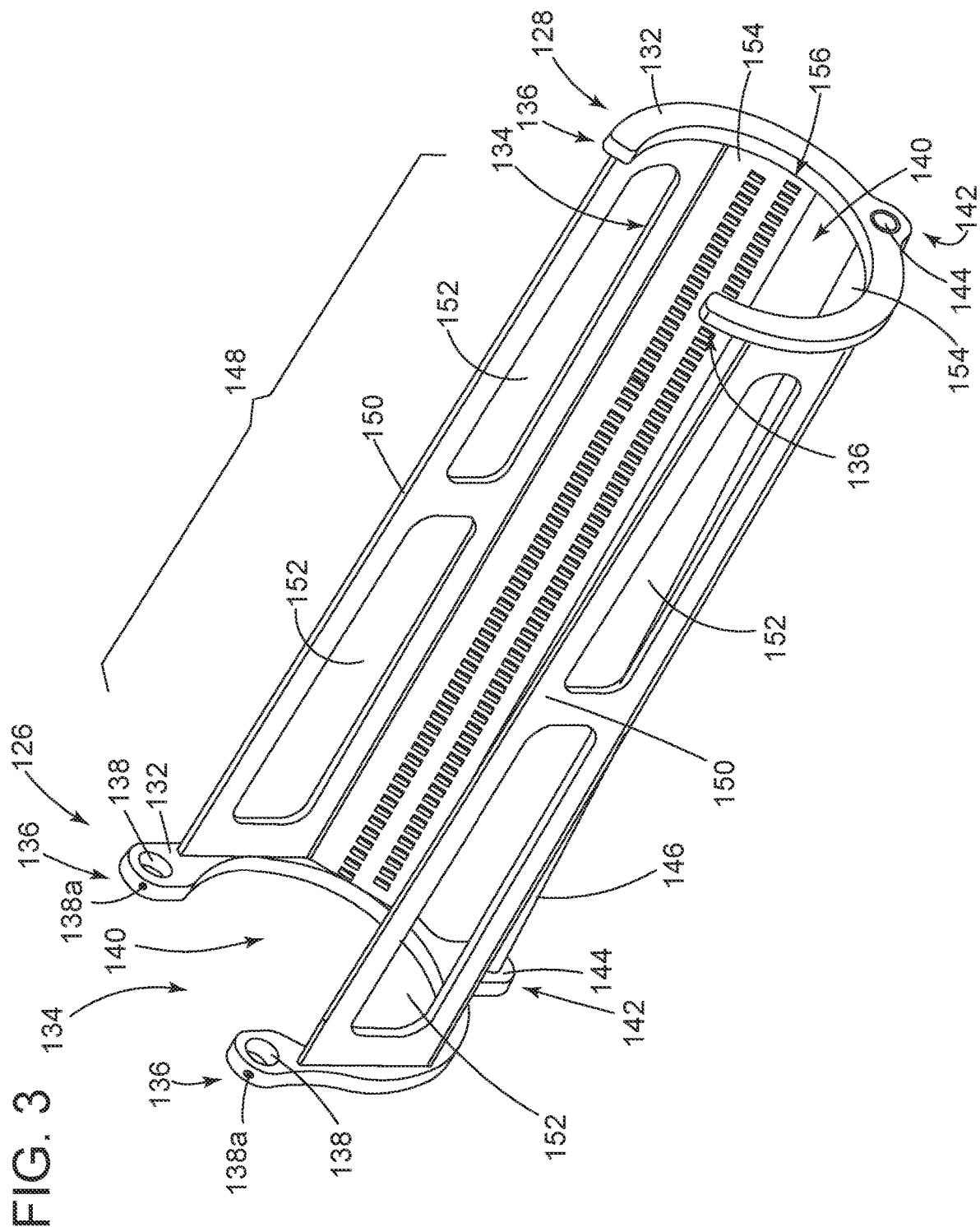
FIG. 3 depicts a perspective view of exemplary structure for the tool of FIG. 1.

FIG. 3 depicts a perspective view of exemplary structure of the support 124. The ends 126, 128 may include plates 132, shown here having a u-shape or horseshoe configuration. This configuration may form an open portion 134 between opposing terminated ends 136. On the first end 126, the terminated ends 136 of the plate 132 (or "first plate") may include through-holes 138 and threaded-holes 138*a* that are perpendicular to the through-holes 138. The middle of the plates 132 may have a central opening 140. The plate 132 may also have a lower boss 142 with an aperture 144, which may also be a through-hole. A rod 146 may install into the through-hole 144 and extend between the plates 132 on the ends 126, 128. In one implementation, the support 124 may also include interposing structure 148 between the ends 126, 128. The structure 148 may include elongate members, shown here as flat plates made of steel or suitable metals. These members may attach to the plates 132. Welds may be well-suited for this purpose; however, fasteners like bolts and nuts may be useful as well. One construction may include opposing upper plates 150 with cutouts 152 that populate all or part of their length. A set of lower plates 154 may reside in proximity to the upper plates 150. The plates 150, 154 may attach to one another along all or part of their adjacent edges. The lower plates 154 may include an arrangement of openings 156 through the material. This arrangement may form rows and columns of equally or evenly spaced holes. In this example, two rows of holes extend along the length of the lower plates 154.

Figure 4:
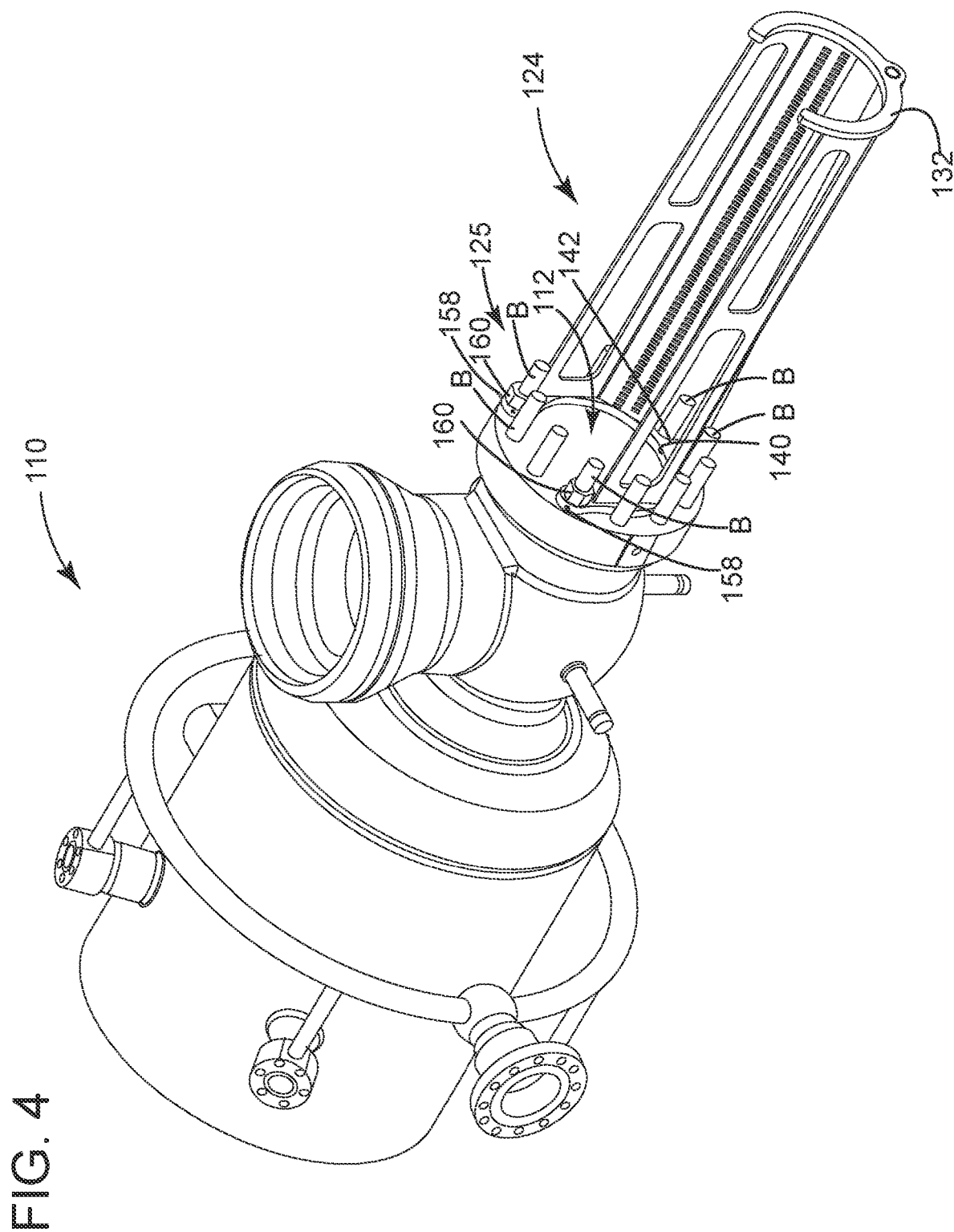
FIG. 4 depicts a perspective view of the example of FIG. 3 in position on a flow control.

FIG. 4 depicts a perspective view of the support 124 in its mounted position on the valve body 110. The first plate mates to the exposed flange at the trim opening T on the valve body 110 in place of a bonnet part of the valve and the actuator (not shown). The u-shape of the first plate is configured for the through-holes 138 to align with a pair of bolts B that populate the exposed flange. These bolts are in a pattern to normally receive the bonnet and the actuator (not shown). Technicians may use set screws 158 that thread into the threaded holes 138*a* to ensure that the inner surface of the opening 140 aligns with the inner surface of the trim opening T into the inner chamber 112 on the valve body 110. This feature provides a smooth, uniform transition for technicians to "push" the trim assembly (not shown) from the support 124 into the valve body 110 or to "pull" the trim assembly (not shown) onto the support 124 as well. Once aligned, technicians may use nuts 160 to secure the support 124 in its place on the valve body 110. In one implementation, the first plate has geometry for it to fit inside the inner diameter of the pattern of bolts B. This geometry may also locate the lower boss 142 between adjacent bolts B as well.

Figure 5:
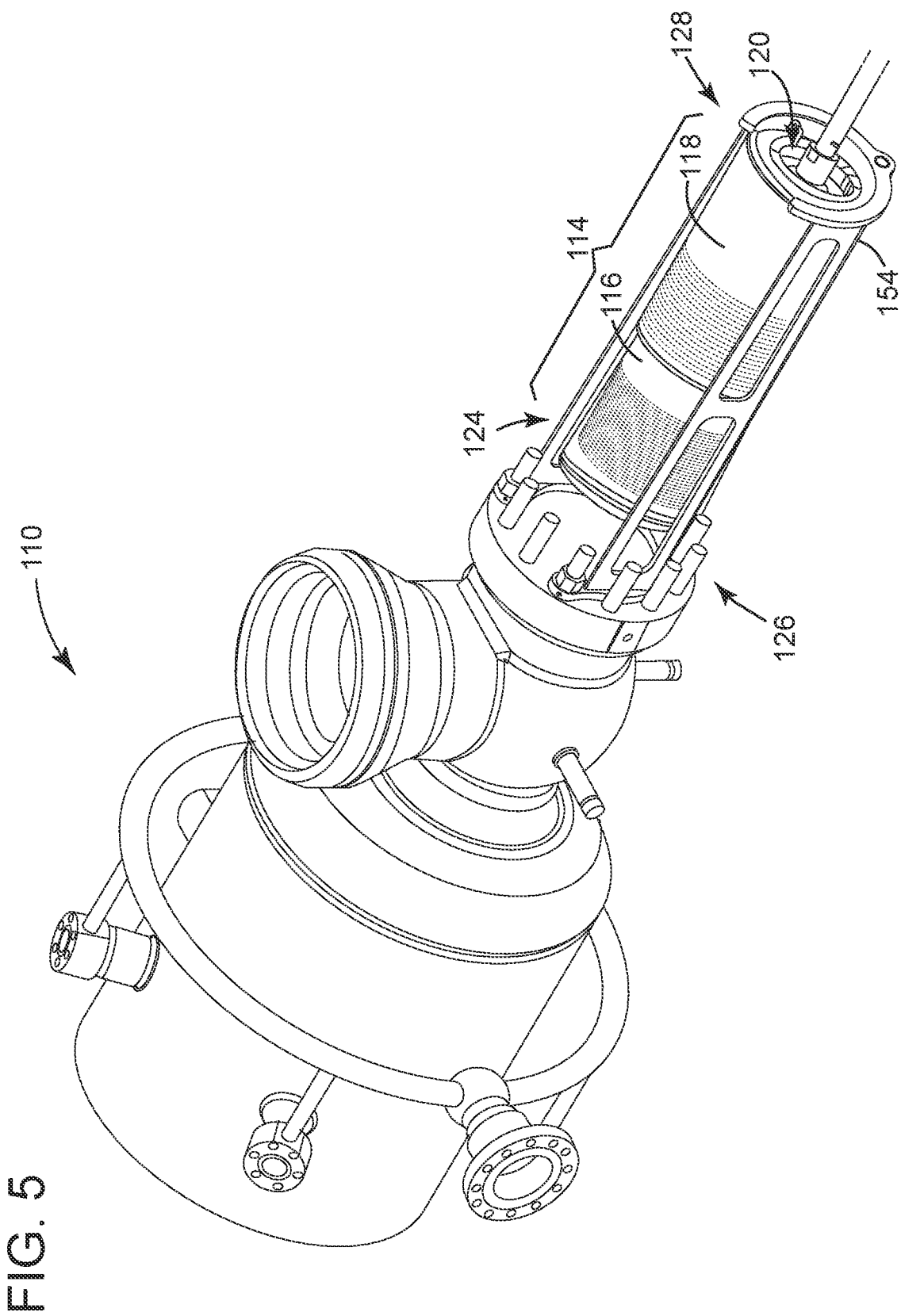
FIG. 5 depicts a perspective view of the example of FIG. 3 in position on a flow control.

FIG. 5 depicts a perspective view of the support 124 also in its mounted position on the valve body 110. Space between the upper plates 150 may allow for the trim assembly 114 to lay horizontally in the support 124. Technicians may use a crane or hoist to lift the trim assembly 114 into position above the support 124. The crane may orient the trim assembly 114 vertically at first so that the diffuser 116 inserts first into the space between the upper plates 150. The diffuser 116 may contact the lower plates 154 and, in turn, operate as a pivot for technicians to rotate the trim assembly 114 downward for the cage 118 (and the plug 120) to reside proximate the plate 132 on the end 128 (or "second plate"). Once in its horizontal position, technicians can move or "push" the trim assembly 114 into the trim opening T into the inner chamber 112 on the valve body 110. This step may require use of pry tool (e.g., pry bar or screw driver) that can insert into the openings 156 (FIG. 3), often in sequential manner from the openings 156 closest to the second plate to the openings 156 closest to the first plate.

Figure 6:
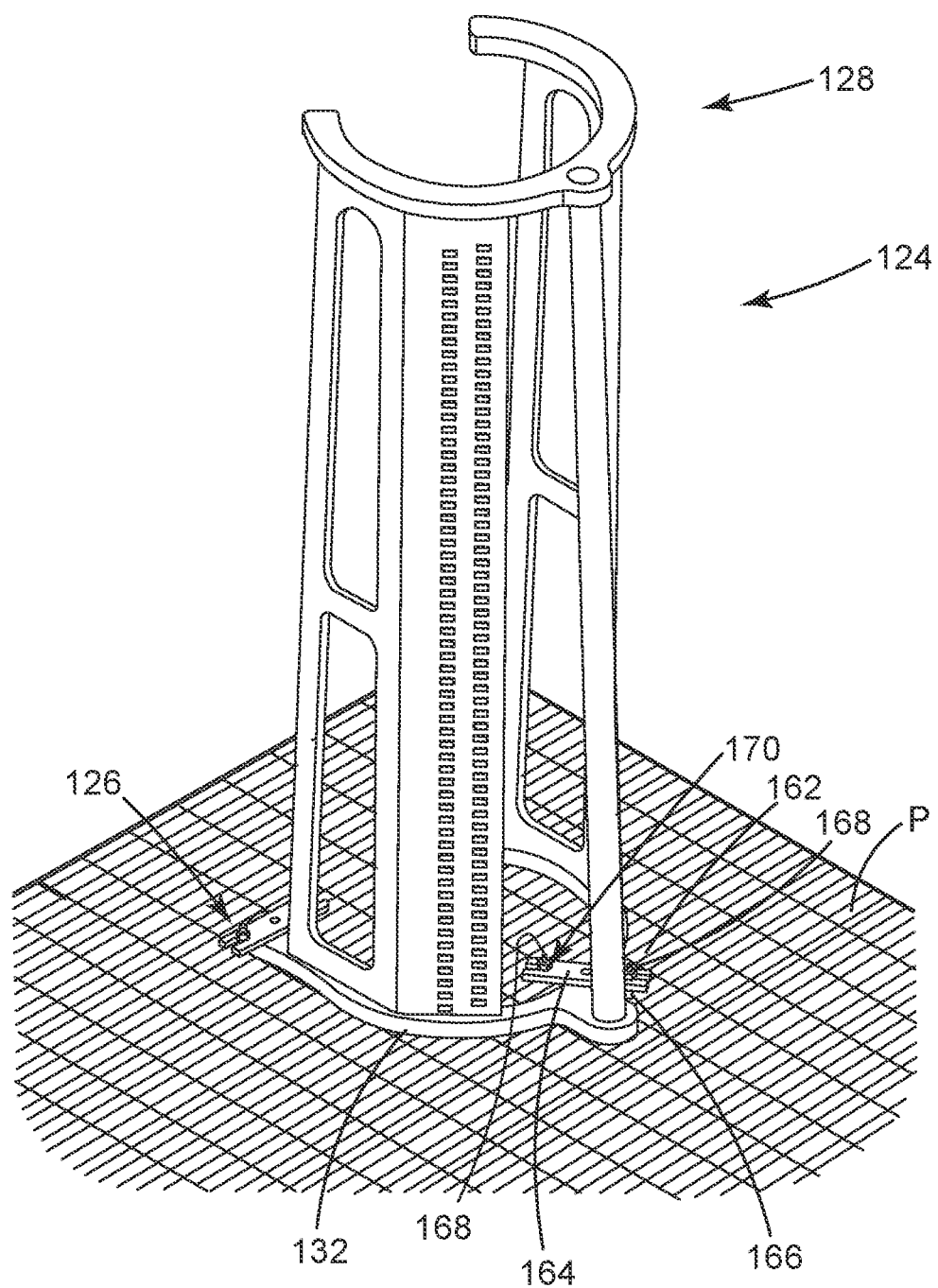
FIG. 6 depicts a perspective view of the example of FIG. 3 in position on a platform.

FIG. 6 depicts a perspective view of the support 124 in its upright or "assembly" position. Several brackets 162 may serve to secure the first plate on the platform P. The brackets 162 may include a plate 164 that extends over part of the first plate. A u-member 166 may extend below the platform P; this device may also have opposing portions 168 that stick through openings in the plate 164. The opposing portions can receive nuts 170 that, when tightened onto the plate 164, cause the brackets 162 to clamp the first plate in position to maintain the support 124 in the upright position.

Figure 7:
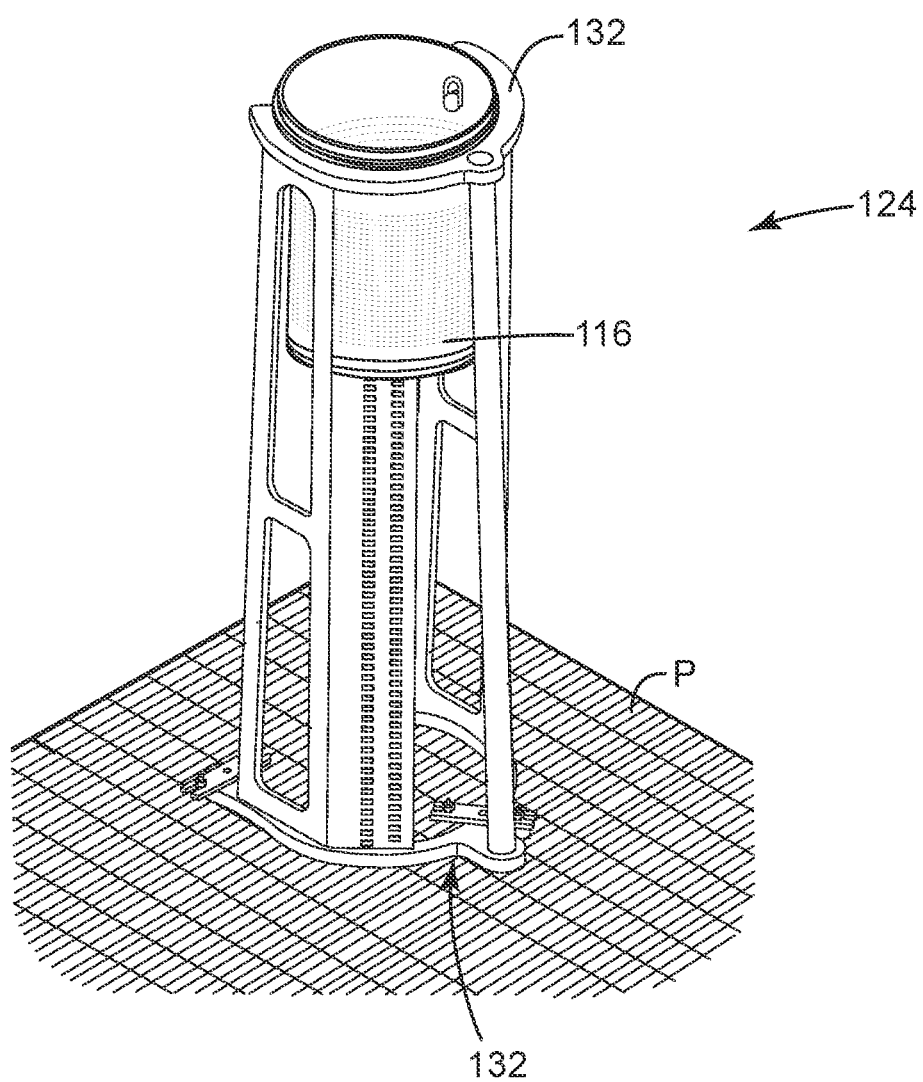
FIG. 7 depicts a perspective view of the example of FIG. 3 in position on a platform.
Figure 8:
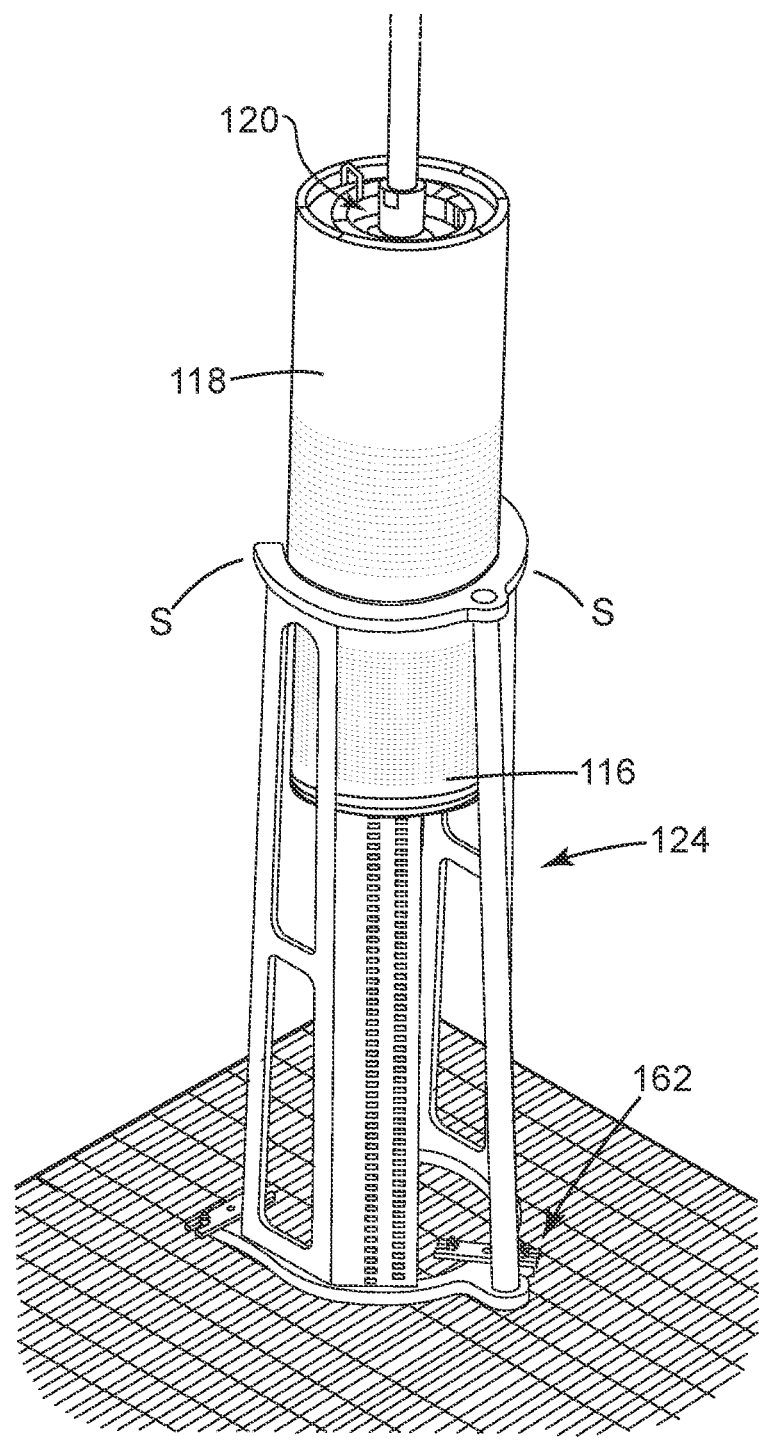
FIG. 8 depicts a perspective view of the example of FIG. 3 in position on a platform.
Figure 9:
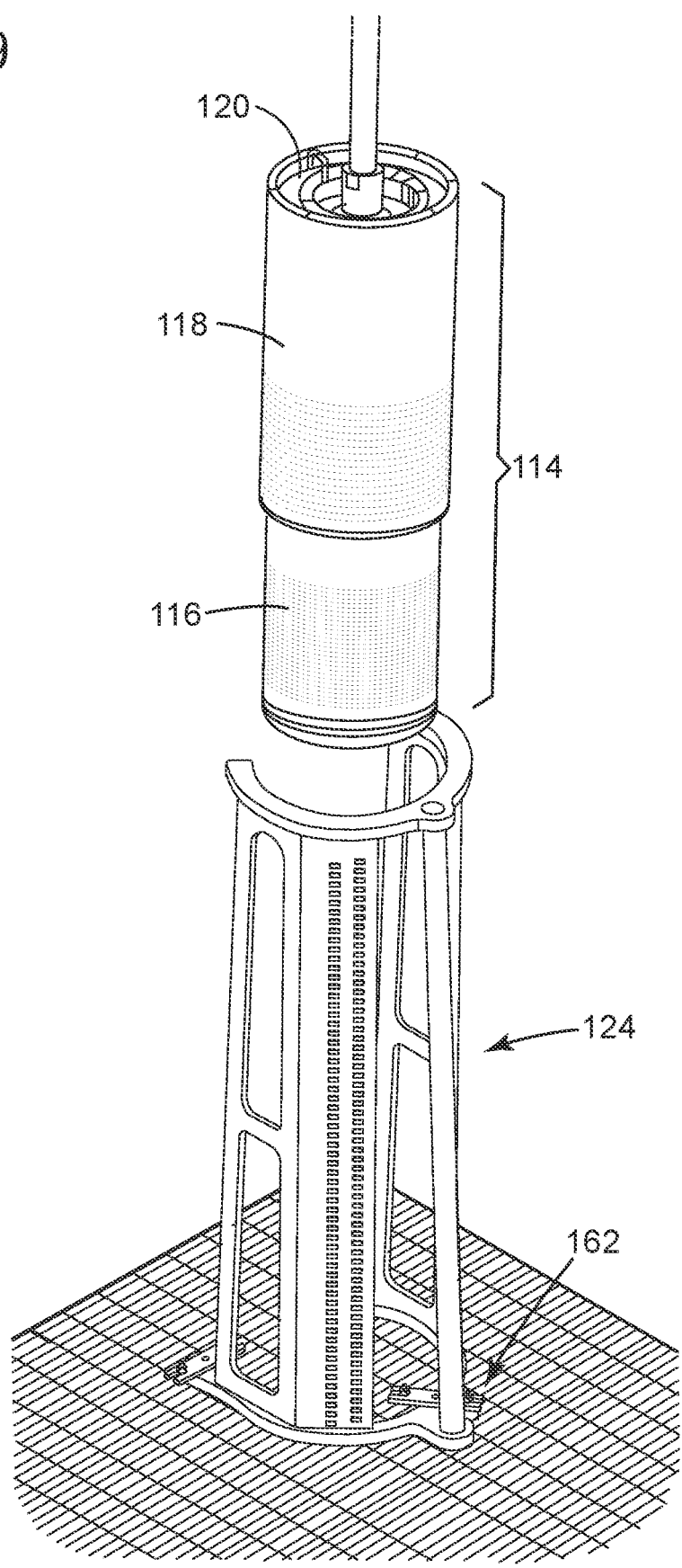
FIG. 9 depicts a perspective view of the example of FIG. 3 in position on a platform.

FIGS. 7, 8, and 9 also depict a perspective view of the support 124 in its upright position. FIG. 7 shows the support 124 after technicians insert the diffuser 116 into the opening 140 (FIG. 3) on the second plate. As shown, the opening 140 (FIG. 3) on the second plate may be sized so that the "seat ring" of the diffuser 116 contacts the second plate. This feature exposes a portion of the diffuser 116 above the second plate for subsequent steps to assembly the trim assembly 114. For example, as best shown in FIG. 8, technicians may place the cage 118 (preferably in combination with the plug 120) onto and over the exposed portion of the diffuser 116. Set screws S may install around the periphery of the cage 118. These set screws may securely engage with the diffuser 116 to create the single trim assembly 114. In FIG. 9, technicians may attach a hoist or crane to the trim assembly 114 to lift it out of the support 124, after which technicians may remove the brackets 162 and mount the support 124 to the exposed flange of the valve body 110, as noted above.

In view of the foregoing, the improvements here simply assembly and maintenance of steam conditioning valves and other flow controls in their installed location. The embodiments provide a multi-use tool that operates both to localize assembly of the trim assembly for these valves and to simplify install of the trim assembly into the valve as well. The features of this tool fit within the generally narrow space constraints found onsite that can prohibit use of other, conventional transoms or supporting hardware. Moreover, functioning of the tool to allow for "local" assembly of the trim can save on labor time, while also promoting safety considerations for technicians as they handle these large, heavy, and often unwieldy pieces of equipment in the field.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus, comprising:
    a first plate with first openings that fit onto bolts existing on a flow control;
    elongate members coupled with the first plate; and
    an adjustment for adjusting a surface on the first plate to align with a surface inside of the flow control,
    wherein the elongate members are operative to support a trim assembly in a cantilever orientation relative to the flow control.

2. The apparatus of claim 1, further comprising:
    a rod coupled with the first plate and extending along the elongate members.

3. The apparatus of claim 1, further comprising:
    a rod coupled to the first plate and extending along the elongate members, wherein the first plate has a boss with an aperture to receive the rod.

4. The apparatus of claim 1, wherein the first plate has a u-shape with terminated ends that have the openings.

5. The apparatus of claim 1, wherein the first plate has a u-shape with terminated ends that have second openings perpendicular to the first openings.

6. The apparatus of claim 1, further comprising:
    a second plate that couples to the elongate members on an end opposite the first plate.

7. The apparatus of claim 1, further comprising:
    a second plate that couples to the elongate members on an end opposite the first plate, wherein the first plate and the second plate each have a central opening.

8. The apparatus of claim 1, further comprising:
    a second plate that couples to the elongate members on an end opposite the first plate, wherein the first plate and the second plate each have a central opening, and wherein the central opening in the second plate has a diameter that is larger than the diameter of the central opening in the first plate.

9. The apparatus of claim 1, wherein the elongate members comprise a row of openings that extends from the first plate.

10. The apparatus of claim 1, wherein the elongate members permit access for tools to extend there through.

11. An apparatus, comprising:
    a support structure that hangs off a steam conditioning valve in place of an actuator, the support structure comprising:
        a first end that engages with bolts on the steam conditioning valve; and
        a cradle coupled with the first end, the cradle having members that cantilever a trim assembly found inside of the steam conditioning valve,
    wherein the cradle comprises set screws that engage with the bolts for adjusting a surface of the cradle to align with a surface inside of the steam conditioning valve.

12. The apparatus of claim 11, wherein the cradle comprises a plate on the first end with openings to engage with a pair of bolts on the steam conditioning valve.

13. The apparatus of claim 11, wherein the cradle comprises a plate on the first end with a central opening having a diameter larger than components of the trim assembly.

14. An apparatus, comprising:
    a support structure that hangs off a steam conditioning valve in place of an actuator, the support structure comprising:

a first end that engages with bolts on the steam conditioning valve;
a cradle coupled with the first end, the cradle having members that cantilever a trim assembly found inside of the steam conditioning valve; and
brackets that secure the first end to a platform.

15. A method, comprising:
securing a support structure to a platform in a first orientation;
assembling a trim assembly for a steam conditioning valve in the support structure;
removing the trim assembly;
securing the support structure to the steam conditioning valve in a second orientation that is different from the first orientation; and
inserting the trim assembly into the support structure,
wherein the support structure is configured to cantilever the trim assembly relative to the steam condition valve.

16. The method of claim 15, wherein the first orientation orients a central axis of the support structure vertically.

17. The method of claim 15, wherein the second orientation orients a central axis of the support structure horizontally.

18. The method of claim 15, further comprising:
pushing the trim assembly into the steam conditioning valve.

19. The method of claim 15, further comprising:
installing the trim assembly into the steam conditioning valve;
removing the support structure from the steam conditioning valve; and
installing an actuator in place of the support structure.

\* \* \* \* \*